(12) United States Patent
Cao et al.

(10) Patent No.: US 11,657,030 B2
(45) Date of Patent: May 23, 2023

(54) MULTI-DIMENSIONAL DATA TAGGING AND REUSE

(71) Applicant: Bank of America Corporation, Charlotte, NC (US)

(72) Inventors: Min Cao, Shanghai (CN); Maik Sperling, Hong Kong (CN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/099,082

(22) Filed: Nov. 16, 2020

(65) Prior Publication Data

US 2022/0156241 A1    May 19, 2022

(51) Int. Cl.
*G06F 16/245* (2019.01)
*G06F 16/22* (2019.01)
*G06F 16/28* (2019.01)

(52) U.S. Cl.
CPC ........ *G06F 16/2264* (2019.01); *G06F 16/245* (2019.01); *G06F 16/285* (2019.01)

(58) Field of Classification Search
CPC ... G06F 16/2264; G06F 16/245; G06F 16/285
See application file for complete search history.

(56) References Cited

U.S. PATENT DOCUMENTS

| | | | |
|---|---|---|---|
| 9,396,188 B2 | 7/2016 | Lyon | |
| 9,576,576 B2 | 2/2017 | Sharifi et al. | |
| 10,275,427 B2 | 4/2019 | Saptharishi et al. | |
| 10,326,748 B1 * | 6/2019 | Brisebois | H04L 63/08 |
| 10,592,504 B2 | 3/2020 | Moreno et al. | |
| 10,733,196 B2 * | 8/2020 | Glickman | G06F 16/26 |
| 2008/0177780 A1 | 7/2008 | Tan | |
| 2010/0082691 A1 | 4/2010 | Jaster et al. | |
| 2010/0179961 A1 | 7/2010 | Berry et al. | |
| 2011/0065082 A1 | 3/2011 | Gal et al. | |
| 2012/0036130 A1 | 2/2012 | Light et al. | |
| 2014/0156646 A1 | 6/2014 | Brust et al. | |
| 2014/0156676 A1 | 6/2014 | Brust et al. | |
| 2015/0073869 A1 | 3/2015 | Tung et al. | |
| 2016/0203494 A1 | 7/2016 | Galligan Davila et al. | |
| 2017/0083484 A1 * | 3/2017 | Patil | G06F 40/247 |
| 2018/0181997 A1 | 6/2018 | Sanjeevaiah Krishnaiah et al. | |
| 2018/0322396 A1 | 11/2018 | Ahuja-Cogny et al. | |
| 2018/0322403 A1 | 11/2018 | Ron et al. | |

(Continued)

*Primary Examiner* — Son T Hoang

(74) *Attorney, Agent, or Firm* — Banner & Witcoff, Ltd.

(57) ABSTRACT

Aspects of the disclosure relate to multi-dimensional data tagging and reuse. A computing platform may receive first response data associated with responses to a first set of queries. Subsequently, the computing platform may apply data tags to the first response data, which may include tagging the first response data based on multiple dimensions. Then, the computing platform may prompt a user of a computing device from which the data originated to validate the data tags applied to the first response data. Next, the computing platform may analyze a second set of queries which may be associated with the same content type. Thereafter, the computing platform may generate second response data associated with responses to the second set of queries based on the data tags applied to the first response data and send the second response data in response to the second set of queries.

20 Claims, 7 Drawing Sheets

(56) References Cited

U.S. PATENT DOCUMENTS

| | | |
|---|---|---|
| 2018/0349472 A1 | 12/2018 | Kohlschuetter et al. |
| 2019/0012374 A1 | 1/2019 | Petroni et al. |
| 2019/0164182 A1* | 5/2019 | Abdullah .............. G06F 16/245 |
| 2019/0220695 A1* | 7/2019 | Nefedov ................ G06N 5/022 |
| 2019/0286676 A1* | 9/2019 | Fatzinger ............ G06F 16/9538 |
| 2020/0004821 A1 | 1/2020 | Chatterjee et al. |

\* cited by examiner

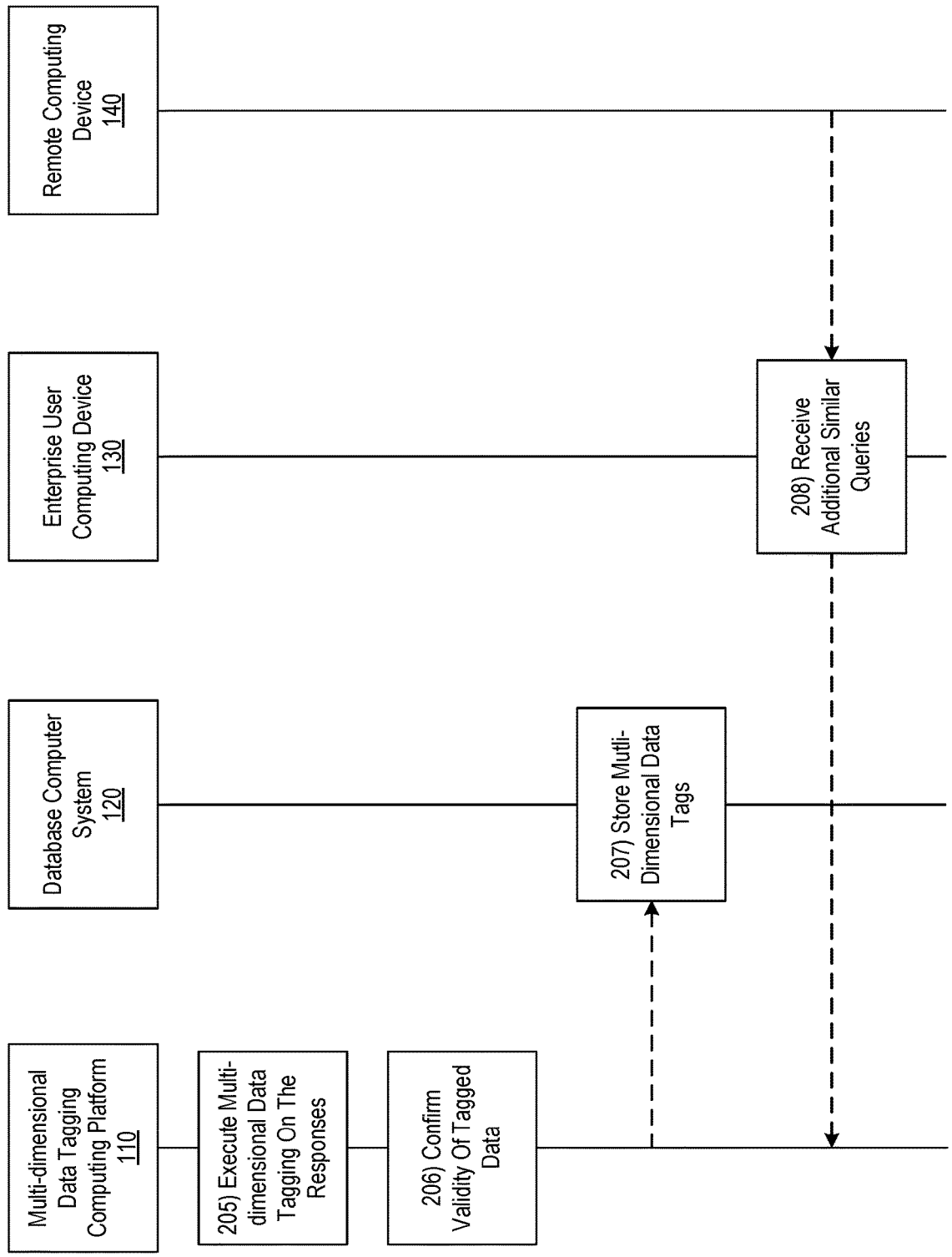

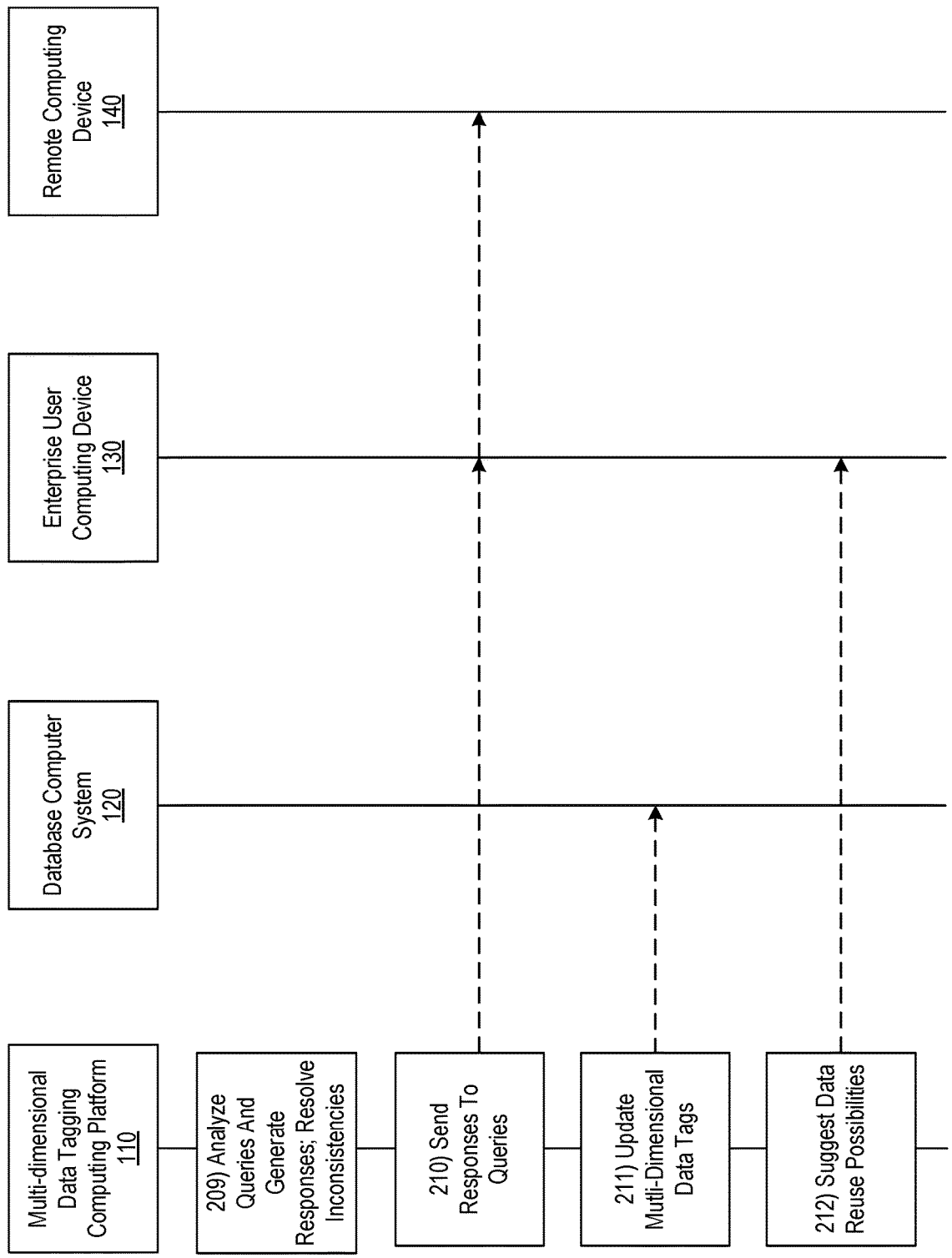

MULTI-DIMENSIONAL DATA TAGGING AND REUSE

BACKGROUND

Aspects of the disclosure relate to data processing, artificial intelligence, and knowledge processing systems. In particular, one or more aspects of the disclosure relate to multi-dimensional data tagging and reuse.

Many organizations receive data requests, such as in the form of questionnaires, regulatory inquiries and/or audit inquiries, and large organizations may receive a particularly large number of such requests. Responding to such data requests often requires a user or analyst to sort through a substantial volume of information used in generating a suitable response. In many instances, the user or analyst repeats the same process to derive a response every time a new data request is received. This may be time consuming, inefficient, and resource intensive. Also, in many instances, there is a missed opportunity to leverage information that was already generated from prior responses in order to derive further useful information.

SUMMARY

Aspects of the disclosure provide effective, efficient, scalable, and convenient technical solutions that address and overcome the technical problems associated with multi-dimensional data tagging and reuse. For example, some aspects of the disclosure provide ways to efficiently identify and access relevant data using various different attributes of the data. Additional aspects of the disclosure may proactively leverage collected data to effectively reuse the data to respond to data inquiries, identify trends, generate reports, generate articles, and/or the like. Further additional aspects of the disclosure may leverage automated learning techniques, artificial intelligence, and/or natural language processing to perform one or more of these and/or other functions.

In accordance with one or more embodiments, a computing platform having at least one processor, a communication interface, and memory may receive, via the communication interface, from one or more data storage computer systems, first response data associated with responses to a first set of queries. Subsequently, the computing platform may apply data tags to the first response data. In addition, applying the data tags to the first response data may include tagging the first response data based on multiple dimensions. Then, the computing platform may prompt a first user of a computing device from which the data originated to validate the data tags applied to the first response data. Next, the computing platform may analyze a second set of queries. In addition, the first set of queries and the second set of queries may be associated with a same content type. Thereafter, the computing platform may generate second response data associated with responses to the second set of queries based on the data tags applied to the first response data. Then, the computing platform may send, via the communication interface, the second response data in response to the second set of queries.

In some embodiments, applying the data tags to the first response data may include tagging the first response data based on one or more of: a data originator, data permissions, contents of data, or a context of data content.

In some embodiments, the computing platform may prompt a second user of a computing device to validate the second response data.

In some embodiments, the computing platform may update a tagging model used in applying data tags to data based on user validation information.

In some embodiments, the computing platform may detect a trend and automatically generate a report based on the detected trend. In some embodiments, the trend may include a trend in response data. In some embodiments, the trend may include a trend in queries.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2C depict an illustrative event sequence for multi-dimensional data tagging and reuse in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
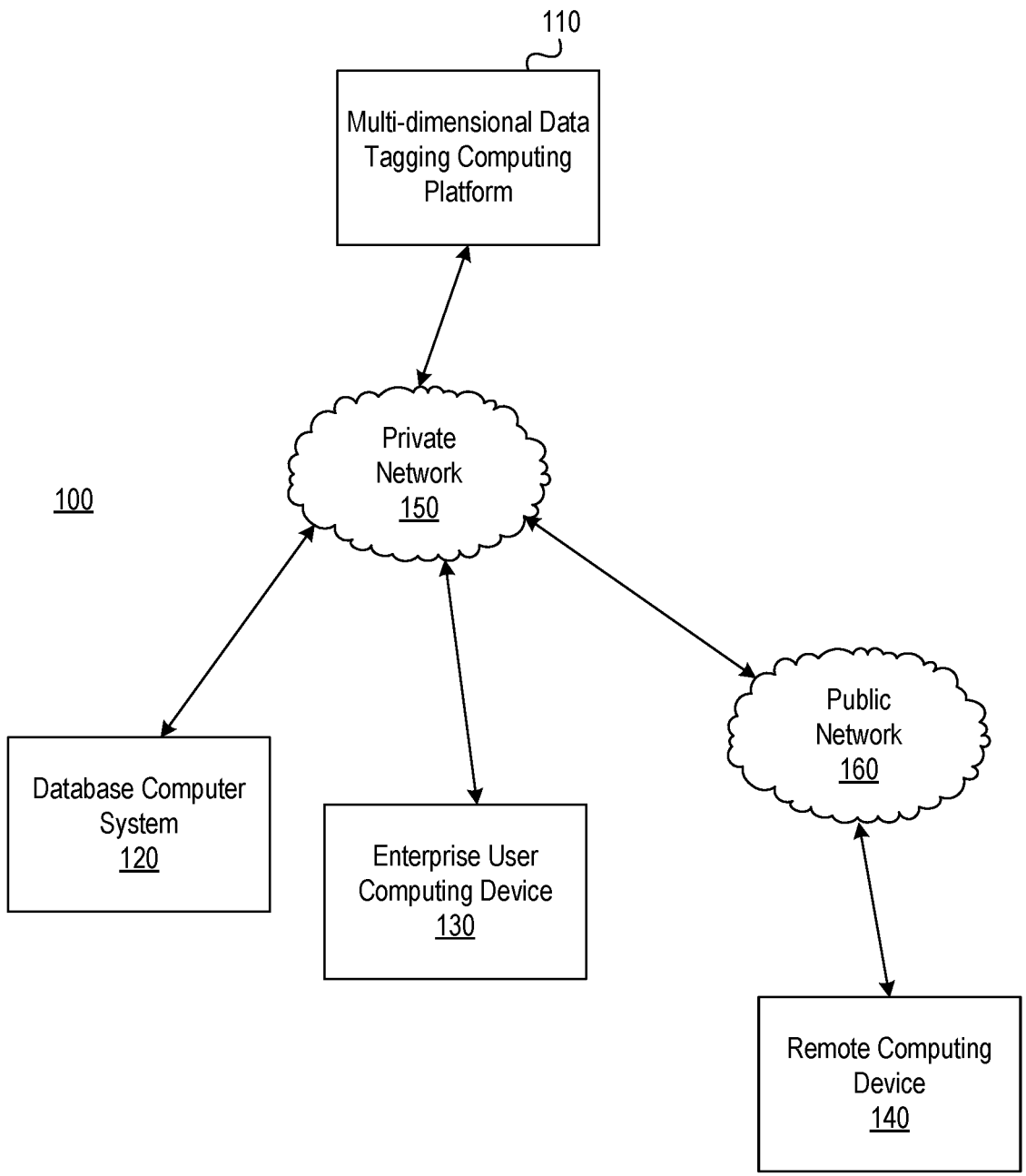
FIGS. 1A and 1B depict an illustrative computing environment for multi-dimensional data tagging and reuse in accordance with one or more example embodiments.
Figure 1B:
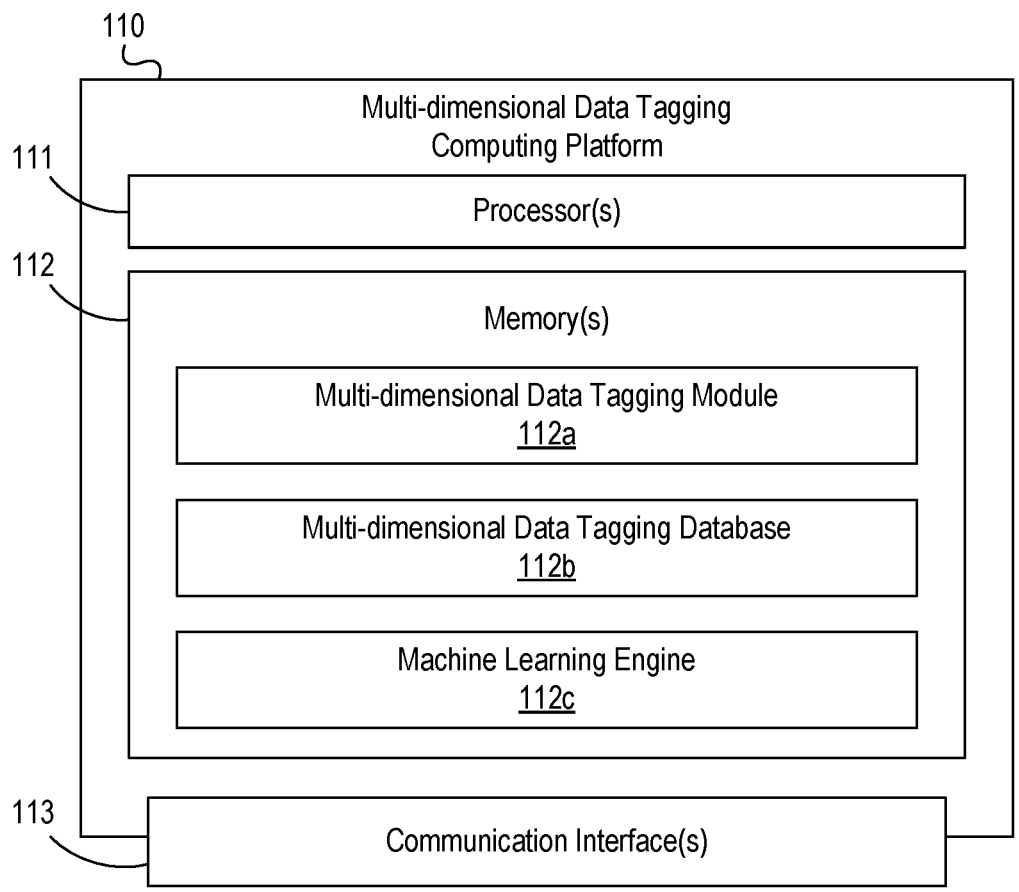

FIGS. 1A and 1B depict an illustrative computing environment for multi-dimensional data tagging and reuse in accordance with one or more example embodiments. Referring to FIG. 1A, computing environment 100 may include one or more computing devices and/or other computing systems. For example, computing environment 100 may include multi-dimensional data tagging computing platform 110, database computer system 120, enterprise user computing device 130, and remote computing device 140. Although one enterprise user computing device 130 is shown for illustrative purposes, any number of enterprise user computing devices may be used without departing from the disclosure. In addition, although one remote computing device 140 is shown for illustrative purposes, any number of remote computing devices may be used without departing from the disclosure.

As illustrated in greater detail below, multi-dimensional data tagging computing platform 110 may include one or more computing devices configured to perform one or more of the functions described herein. For example, multi-dimensional data tagging computing platform 110 may include one or more computers (e.g., laptop computers, desktop computers, servers, server blades, or the like).

Database computer system 120 may include different information storage entities storing documents, data, and/or other information associated with questionnaires, surveys, assessments, compliance reports, and/or the like. In some examples, database computer system 120 may store a collection of questionnaires that have been previously sent (e.g., over a period of time such as a defined period of weeks, months, or years). In some examples, database computer system 120 may store queries and associated responses to the queries (e.g., query-response pairs). In some examples, such as for paper questionnaires, manual verification may be conducted and responses may be entered into and/or received by database computer system 120. In some embodiments, database computer system 120 may allow and/or store records of data with multiple dimensions or unlimited dimensions. In some examples, database computer system 120 may store a change log of data and their corresponding data tags (e.g., to allow rolling-back of changes to data tags), version information of data and their corresponding data tags, and/or reuse information indicating where and/or which version of data has been reused to generate responses.

Enterprise user computing device 130 may include one or more computing devices and/or other computer components (e.g., processors, memories, communication interfaces). For instance, enterprise user computing device 130 may be a server, desktop computer, laptop computer, tablet, mobile device, or the like, and may be associated with an enterprise organization operating multi-dimensional data tagging computing platform 110. Remote computing device 140 may include one or more computing devices and/or other computer components (e.g., processors, memories, communication interfaces). For instance, remote computing device 140 may be a server, desktop computer, laptop computer, tablet, mobile device, or the like, and may be used by a requestor, such as an external auditor or a regulator that is external to the organization.

Computing environment 100 also may include one or more networks, which may interconnect one or more of multi-dimensional data tagging computing platform 110, database computer system 120, enterprise user computing device 130, and remote computing device 140. For example, computing environment 100 may include private network 150 and public network 160. Private network 150 and/or public network 160 may include one or more sub-networks (e.g., local area networks (LANs), wide area networks (WANs), or the like). Private network 150 may be associated with a particular organization (e.g., a corporation, financial institution, educational institution, governmental institution, or the like) and may interconnect one or more computing devices associated with the organization. For example, multi-dimensional data tagging computing platform 110, database computer system 120, and enterprise user computing device 130 may be associated with an organization (e.g., a financial institution), and private network 150 may be associated with and/or operated by the organization, and may include one or more networks (e.g., LANs, WANs, virtual private networks (VPNs), or the like) that interconnect multi-dimensional data tagging computing platform 110, database computer system 120, and enterprise user computing device 130 and one or more other computing devices and/or computer systems that are used by, operated by, and/or otherwise associated with the organization. Public network 160 may connect private network 150 and/or one or more computing devices connected thereto (e.g., multi-dimensional data tagging computing platform 110, database computer system 120, and enterprise user computing device 130) with one or more networks and/or computing devices that are not associated with the organization. For example, remote computing device 140 might not be associated with an organization that operates private network 150, and public network 160 may include one or more networks (e.g., the Internet) that connect remote computing device 140 to private network 150 and/or one or more computing devices connected thereto (e.g., multi-dimensional data tagging computing platform 110, database computer system 120, and enterprise user computing device 130).

In one or more arrangements, multi-dimensional data tagging computing platform 110, database computer system 120, enterprise user computing device 130, and remote computing device 140 may be any type of computing device capable of receiving a user interface, receiving input via the user interface, and communicating the received input to one or more other computing devices. For example, multi-dimensional data tagging computing platform 110, database computer system 120, enterprise user computing device 130, remote computing device 140, and/or the other systems included in computing environment 100 may, in some instances, include one or more processors, memories, communication interfaces, storage devices, and/or other components. As noted above, and as illustrated in greater detail below, any and/or all of the computing devices included in computing environment 100 may, in some instances, be special-purpose computing devices configured to perform specific functions.

Referring to FIG. 1B, multi-dimensional data tagging computing platform 110 may include one or more processor(s) 111, memory(s) 112, and communication interface(s) 113. A data bus may interconnect processor 111, memory 112, and communication interface 113. Communication interface 113 may be a network interface configured to support communication between multi-dimensional data tagging computing platform 110 and one or more networks (e.g., private network 150, public network 160, or the like). Memory 112 may include one or more program modules having instructions that when executed by processor 111 cause multi-dimensional data tagging computing platform 110 to perform one or more functions described herein and/or one or more databases and/or other libraries that may store and/or otherwise maintain information which may be used by such program modules and/or processor 111.

In some instances, the one or more program modules and/or databases may be stored by and/or maintained in different memory units of multi-dimensional data tagging computing platform 110 and/or by different computing devices that may form and/or otherwise make up multi-dimensional data tagging computing platform 110. For example, memory 112 may have, store, and/or include a multi-dimensional data tagging module 112a, a multi-dimensional data tagging database 112b, and a machine learning engine 112c. Multi-dimensional data tagging module 112a may have instructions that direct and/or cause multi-dimensional data tagging computing platform 110 to, for instance, automatically tag data and intelligently reuse the data, as discussed in greater detail below. Multi-dimensional data tagging database 112b may store information used by multi-dimensional data tagging module 112a and/or multi-dimensional data tagging computing platform 110 in tagging and reusing data and/or in performing other functions, as discussed in greater detail below. Machine learning engine 112c may have instructions that direct and/or cause multi-dimensional data tagging computing platform 110 to set, define, and/or iteratively redefine rules, techniques and/or other parameters used by multi-dimensional data tagging computing platform 110 and/or other systems in computing environment 100 in automatically tagging data, dynamically updating tags, and intelligently reusing the data.

Figure 2A:
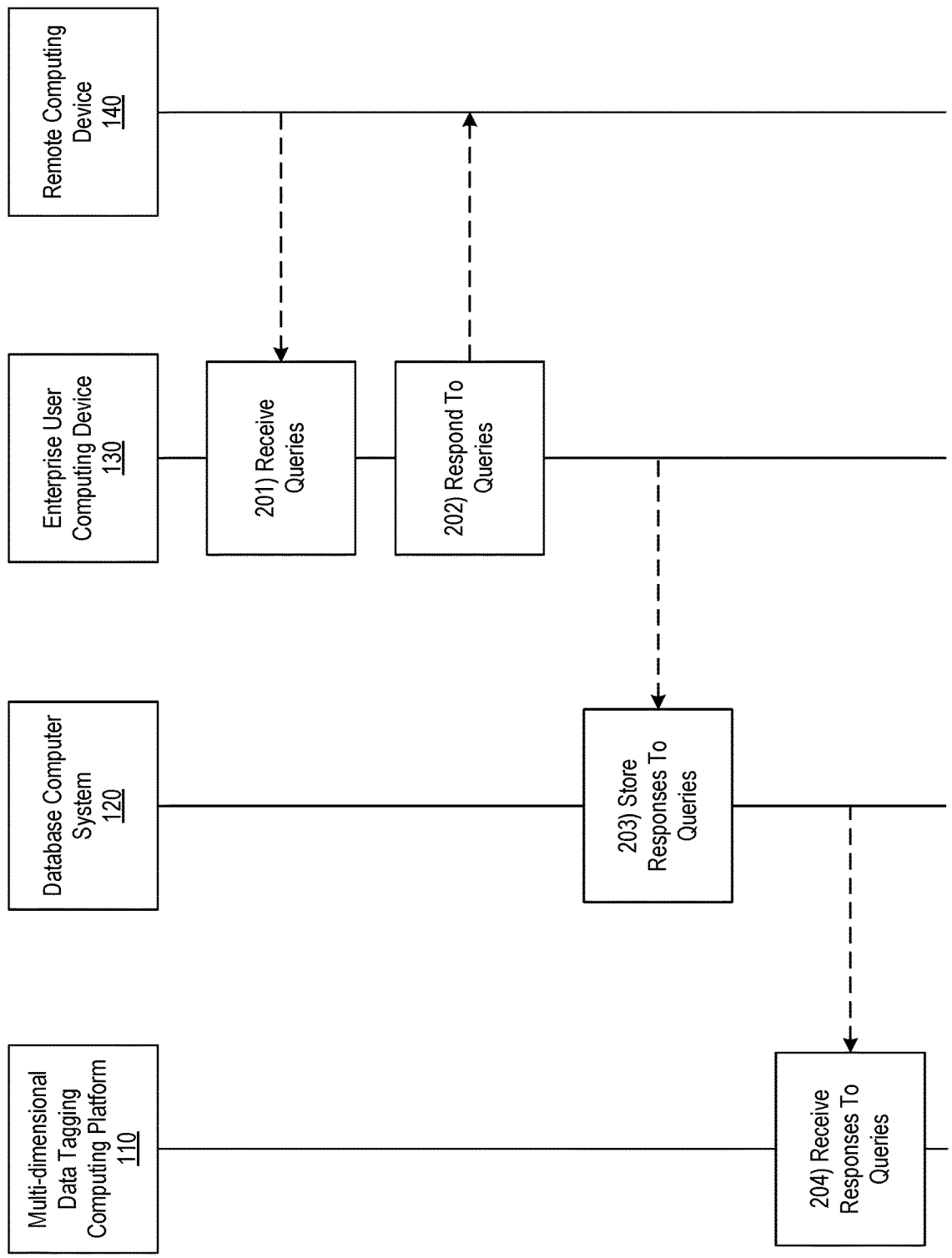

FIGS. 2A-2C depict an illustrative event sequence for multi-dimensional data tagging and reuse in accordance with one or more example embodiments. Referring to FIG. 2A, at step 201, a user of an enterprise computing device (e.g., enterprise user computing device 130) may receive one or more queries from a requesting computing device (e.g., remote computing device 140). In response, at step 202, the user of the computing device (e.g., enterprise user computing device 130) may respond to the one or more queries. For example, a user of a computing device (e.g., enterprise user computing device 130) may receive one or more queries in the form of a questionnaire from an auditor or regulator gathering information from an enterprise. At step 203, database computer system 120 may store the responses to the one or more queries provided by the user of the enterprise computing device (e.g., enterprise user computing device 130).

At steps 204 through 206, as users and user devices create data in database computer system 120, multi-dimensional data tagging computing platform 110, via an artificial intelligence (AI) process, may tag the data that it is capable of reading and processing from database computer system 120, and prompt users (e.g., a data creator or original owner of the data) to confirm, edit, and/or update tags on the data (e.g., at certain times or on a periodic basis). For example, users (e.g., a data creator or original owner of the data) may view a list of tagged data that the user currently owns or previously owned, and/or information showing where or how data owned by the user is being or has been used in order to review the validity of tagged data and make updates as desired. Additionally or alternatively, such a review may be triggered manually by the data owner. As data or documents are added to a database, their content may be contextualized using natural language processing, and as rules or regulations change, data tags may be updated.

In some embodiments, at step 204, multi-dimensional data tagging computing platform 110 may retrieve and receive, via a communication interface (e.g., communication interface 113), from one or more data storage computer systems (e.g., database computer system 120), first response data associated with responses to a first set of queries. Referring to FIG. 2B, at step 205, multi-dimensional data tagging computing platform 110 may apply data tags to the first response data. In addition, applying the data tags to the first response data may include tagging the first response data based on multiple dimensions. For example, multi-dimensional data tagging computing platform 110 may tag the first response data based on multiple dimensions, including one or more of: a data originator or owner (e.g., who is created the data or who last edited the data), data permissions (e.g., who is allowed to access the data), contents of data (e.g., what the data concerns), or a context of data content (e.g., how the data is intended to be used). In some examples, the data tags may indicate a date on which the data was provided. In some examples, the data tags may indicate an approved scope of usage (e.g., how a data owner is to be notified, such as whether the data may be reused without approval or with just a notification to the data owner). In some embodiments, the data tags may indicate whether minor variations or rephrasing is allowed, or if source approval is needed from the data originator to rephrase the data for data reuse.

In turn, at step 206, multi-dimensional data tagging computing platform 110 may prompt a first user of a computing device from which the data originated to confirm validity of the data tags applied to the first response data. For example, the AI process may prompt the data creator (e.g., original owner of the data) to confirm that the tags that have been applied to the data may be properly assigned (e.g., reused) so as to protect the rights of the data owner (e.g., maintain privileges). In some embodiments, multi-dimensional data tagging computing platform 110 may update a tagging model used in applying data tags to data based on user validation information (e.g., validation information received from a user of a computing device). At step 207, multi-dimensional data tagging computing platform 110 may store the data tags (e.g., validated multi-dimensional data tags) in database computer system 120.

Subsequently, at step 208, a user of an enterprise computing device (e.g., enterprise user computing device 130) may receive a second set of queries from a requesting computing device (e.g., remote computing device 140) that may be similar to the first set of queries. In some embodiments, the first set of queries and the second set of queries may be associated with a same content type. For instance, the first set of queries and the second set of queries may be associated with same or similar types of questions, same or similar subject matter, same or similar verbiage, same or similar format, or the like. For instance, the first set of queries and the second set of queries may be associated with a same content type, but using different languages or different terminology.

Referring to FIG. 2C, at step 209, multi-dimensional data tagging computing platform 110 may receive and analyze the second set of queries and generate second response data associated with responses to the second set of queries based on the data tags applied to the first response data. For example, multi-dimensional data tagging computing platform 110 may analyze, using AI and natural language processing, a subsequent questionnaire and automatically fill in as many fields as possible based on data tags that it has created and based on information about existing context and permission information. In some examples, in generating the second response data, multi-dimensional data tagging computing platform 110 may prompt a data owner or another user of an enterprise user computing device to validate the second response data (e.g., in instances where the system needs permission from a certain user to reuse the data). In some examples, in generating the second response data, multi-dimensional data tagging computing platform 110 may generate and send notifications to a data owner or another user of an enterprise user computing device that the data that is being reused. In some examples, multi-dimensional data tagging computing platform 110 may detect inconsistencies in the tagged data or in how the data is reused. In such a case, multi-dimensional data tagging computing platform 110 may use the data tags to identify the appropriate user to seek clarification from in order to complete the response to the second set of queries. Additionally or alternatively, in some examples (e.g., for dynamic information such as information that is modified or changed relatively frequently), in generating the second response data, multi-dimensional data tagging computing platform 110 may generate a link or other access/reference element that provides instructions as to where corresponding response information may be found (e.g., to retrieve a most recent dataset directly from a data source). Additionally or alternatively, in generating the second response data, multi-dimensional data tagging computing platform 110 may interact with and extract information directly from websites, or other data sources or applications, such that the second response data may be automatically updated with the most recent data from a website or other data source or application.

At step 210, multi-dimensional data tagging computing platform 110 may send, via the communication interface (e.g., communication interface 113), the second response data in response to the second set of queries. In some examples, multi-dimensional data tagging computing platform 110 may send, via the communication interface (e.g., communication interface 113), the second response data directly to the requesting computing device (e.g., remote computing device 140) in response to the second set of queries. In other examples, multi-dimensional data tagging computing platform 110 may send, via the communication interface (e.g., communication interface 113), the second response data to a computing device within the private network (e.g., enterprise user computing device 130 in private network 150) for review and/or approval prior to forwarding the second response data to the requesting computing device (e.g., remote computing device 140) through an external network (e.g., public network 160). Additionally or alternatively, in sending the second response data to a computing device within the private network (e.g., enterprise user computing device 130) for review and/or approval, multi-dimensional data tagging computing platform 110 may cause the computing device (e.g., enterprise user computing device 130) to provide feedback (e.g., to a data owner or a system administrator) on the generated second response data, such as to further refine the developed tagging and machine learning models. Additionally or alternatively, in sending the second response data to a computing device within the private network (e.g., enterprise user computing device 130) for review and/or approval, multi-dimensional data tagging computing platform 110 may cause the computing device (e.g., enterprise user computing device 130) to rate the accuracy of generated response data (e.g., how closely the response meets the requestor's data requirements), such as to further refine the developed tagging and machine learning models. At step 211, multi-dimensional data tagging computing platform 110 may update the multi-dimensional data tags stored in the database computer system 120.

Figure 3:
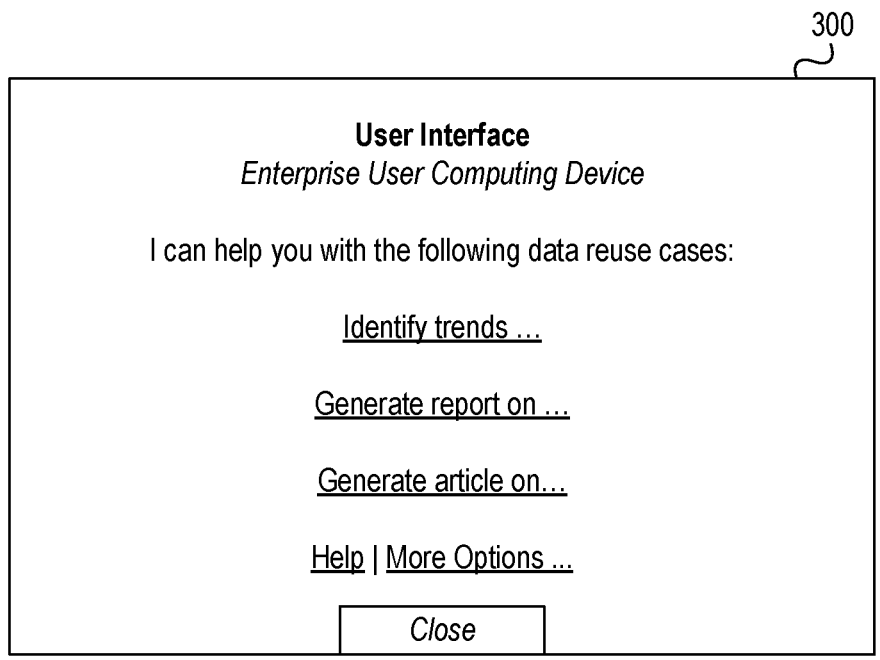
FIG. 3 depict example graphical user interfaces for multi-dimensional data tagging and reuse in accordance with one or more example embodiments.

In some embodiments, at step 212, multi-dimensional data tagging computing platform 110 may, using AI and natural language processing, suggest data reuse possibilities. For instance, multi-dimensional data tagging computing platform 110 may learn and maintain a classification model for suggesting data reuse cases to an end user as to how the data can be reused. In some embodiments, multi-dimensional data tagging computing platform 110 may detect a trend automatically generate a report based on the detected trend. For example, the trend may be a trend in response data. For example, the trend may be a trend in queries (e.g., auditor or regulator queries). For example, in suggesting data reuse possibilities, multi-dimensional data tagging computing platform 110 may cause the at least one computing device (e.g., enterprise user computing device 130) to display and/or otherwise present one or more graphical user interfaces similar to graphical user interface 300, which is illustrated in FIG. 3. As seen in FIG. 3, graphical user interface 300 may include text and/or other information notifying the user of the at least one computing device (e.g., enterprise user computing device 130) of various data reuse possibilities (e.g., "I can help you with the following data reuse cases: [Identify trends . . . ] [Generate report on . . . ] [Generate article on . . . ]"). It will be appreciated that other and/or different notifications may also be provided.

Figure 4:
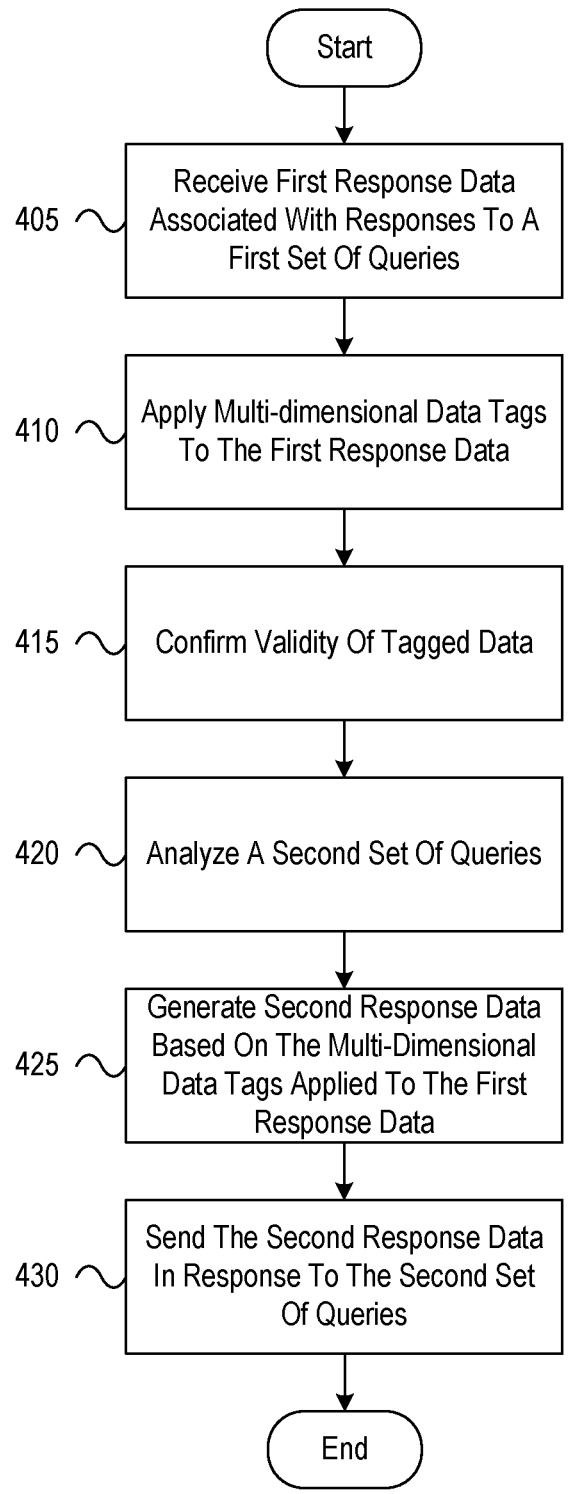
FIG. 4 depicts an illustrative method for multi-dimensional data tagging and reuse in accordance with one or more example embodiments.

FIG. 4 depicts an illustrative method for multi-dimensional data tagging and reuse in accordance with one or more example embodiments. Referring to FIG. 4, at step 405, a computing platform having at least one processor, a communication interface, and memory may receive, via the communication interface, from one or more data storage computer systems, first response data associated with responses to a first set of queries. At step 410, the computing platform may apply data tags to the first response data. In addition, applying the data tags to the first response data may include tagging the first response data based on multiple dimensions. At step 415, the computing platform may prompt a first user of a computing device from which the data originated to validate the data tags applied to the first response data. At step 420, the computing platform may analyze a second set of queries. In addition, the first set of queries and the second set of queries may be associated with a same content type. At step 425, the computing platform may generate second response data associated with responses to the second set of queries based on the data tags applied to the first response data. At step 430, the computing platform may send, via the communication interface, the second response data in response to the second set of queries.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   receive, via the communication interface, from one or more data storage computer systems, first response data associated with responses to a first set of queries;
   apply, by a machine learning engine, data tags to the first response data, wherein applying the data tags to the first response data comprises tagging the first response data based on multiple dimensions, the multiple dimensions including data owner information, data content information, and data context information;
   identify a data owner of the first response data based on the applied data tags;
   transmit a user interface to a computing device of the data owner of the first response data to prompt the data owner of the first response data to validate the data tags applied to the first response data;
   receive, from the computing device of the data owner of the first response data and via the user interface, validation of the data tags applied to the first response data;
   analyze, using natural language processing, a second set of queries, wherein the first set of queries and the second set of queries are associated with a same content type but are in different languages;
   generate, by extracting data from one or more websites, second response data associated with responses to the second set of queries based on the data tags applied to the first response data;
   send, via the communication interface and to an approval computing device, the second response data in response to the second set of queries;
   receive, from the approval computing device, an accuracy of the second response data;
   update, based on the accuracy of the second response data, a machine learning model of the machine learning engine; and
   send, to a computing device from which the second set of queries was received, the second response data in response to the second set of queries.

2. The computing platform of claim 1, wherein applying the data tags to the first response data comprises tagging the first response data further based on data permissions.

3. The computing platform of claim 1, wherein the memory stores additional computer-readable instructions that, when executed by the at least one processor, cause the computing platform to:
   transmit a further user interface to prompt another user of a computing device to validate the second response data.

4. The computing platform of claim 1, wherein the memory stores additional computer-readable instructions that, when executed by the at least one processor, cause the computing platform to:
   further update the machine learning model used in applying data tags to data based on user validation information.

5. The computing platform of claim 1, wherein the memory stores additional computer-readable instructions that, when executed by the at least one processor, cause the computing platform to:
   detect a trend; and
   automatically generate a report based on the detected trend.

6. The computing platform of claim 5, wherein the trend is a trend in response data.

7. The computing platform of claim 5, wherein the trend is a trend in queries.

8. A method, comprising:
   at a computing platform comprising at least one processor, a communication interface, and memory:
   receiving, by the at least one processor, via the communication interface, from one or more data storage computer systems, first response data associated with responses to a first set of queries;
   applying, by a machine learning engine, data tags to the first response data, wherein applying the data tags to the first response data comprises tagging the first response data based on multiple dimensions, the multiple dimensions including data owner information, data content information, and data context information;
   identifying, by the at least one processor, a data owner of the first response data based on the applied data tags;
   transmitting, by the at least one processor, a user interface to a computing device of the data owner of the first response data to prompt the data owner of the first response data to validate the data tags applied to the first response data;
   receiving, by the at least one processor, via the user interface and from the computing device of the data owner of the first response data, validation of the data tags applied to the first response data;
   analyzing, by the at least one processor and using natural language processing, a second set of queries, wherein the first set of queries and the second set of queries are associated with a same content type but are in different languages;

generating, by the at least one processor and by extracting data from one or more websites, second response data associated with responses to the second set of queries based on the data tags applied to the first response data; and sending, by the at least one processor and to an approval computing device via the communication interface, the second response data in response to the second set of queries;

receiving, by the at least one processor and from the approval computing device, an accuracy of the second response data;

updating, by the at least one processor and based on the accuracy of the second response data, a machine learning model of the machine learning engine; and sending, by the at least one processor and to a computing device from which the second set of queries was received, the second response data in response to the second set of queries.

9. The method of claim 8, wherein applying the data tags to the first response data comprises tagging the first response data further based on data permissions.

10. The method of claim 8, further comprising:
transmitting, by the at least one processor, a further user interface to prompt another user of a computing device to validate the second response data.

11. The method of claim 8, further comprising:
further updating, by the at least one processor, the machine learning model used in applying data tags to data based on user validation information.

12. The method of claim 8, further comprising:
detecting, by the at least one processor, a trend; and
automatically generating, by the at least one processor, a report based on the detected trend.

13. The method of claim 12, wherein the trend is a trend in response data.

14. The method of claim 12, wherein the trend is a trend in queries.

15. One or more non-transitory computer-readable media storing instructions that, when executed by a computing platform comprising at least one processor, a communication interface, and memory, cause the computing platform to:

receive, via the communication interface, from one or more data storage computer systems, first response data associated with responses to a first set of queries;

apply, by a machine learning engine, data tags to the first response data, wherein applying the data tags to the first response data comprises tagging the first response data based on multiple dimensions, the multiple dimensions including data owner information, data content information, and data context information;

identify a data owner of the first response data based on the applied data tags;

transmit a user interface to a computing device of the data owner of the first response data to prompt the data owner of the first response data to validate the data tags applied to the first response data;

receive, from the computing device of the data owner of the first response data and via the user interface, validation of the data tags applied to the first response data;

analyze, using natural language processing, a second set of queries, wherein the first set of queries and the second set of queries are associated with a same content type but are in different languages;

generate, by extracting data from one or more websites, second response data associated with responses to the second set of queries based on the data tags applied to the first response data;

send, via the communication interface and to an approval computing device, the second response data in response to the second set of queries;

receive, from the approval computing device, an accuracy of the second response data;

update, based on the accuracy of the second response data, a machine learning model of the machine learning engine; and send, to a computing device from which the second set of queries was received, the second response data in response to the second set of queries.

16. The one or more non-transitory computer-readable media of claim 15, wherein applying the data tags to the first response data comprises tagging the first response data further based on data permissions content.

17. The one or more non-transitory computer-readable media of claim 15, wherein the memory stores additional computer-readable instructions that, when executed by the at least one processor, further cause the computing platform to:
transmit a further user interface to prompt another user of a computing device to validate the second response data.

18. The one or more non-transitory computer-readable media of claim 15, wherein the memory stores additional computer-readable instructions that, when executed by the at least one processor, further cause the computing platform to:
further update the machine learning model used in applying data tags to data based on user validation information.

19. The one or more non-transitory computer-readable media of claim 15, wherein the memory stores additional computer-readable instructions that, when executed by the at least one processor, further cause the computing platform to:
detect a trend; and
automatically generate a report based on the detected trend.

20. The one or more non-transitory computer-readable media of claim 19, wherein the trend is a trend in response data.

\* \* \* \* \*

UNITED STATES PATENT AND TRADEMARK OFFICE
CERTIFICATE OF CORRECTION

PATENT NO. : 11,657,030 B2  
APPLICATION NO. : 17/099082  
DATED : May 23, 2023  
INVENTOR(S) : Cao et al.

Page 1 of 1

It is certified that error appears in the above-identified patent and that said Letters Patent is hereby corrected as shown below:

In the Claims

Column 11, Claim 8, Line 8:
After "data;", delete "and"

Signed and Sealed this  
Twenty-sixth Day of March, 2024

Katherine Kelly Vidal  
*Director of the United States Patent and Trademark Office*